US010194588B2

(12) United States Patent
Lohrentz (10) Patent No.: US 10,194,588 B2
(45) Date of Patent: Feb. 5, 2019

(54) CORN HEADER CONFIGURED TO REDUCE KERNEL LOSSES (71) Applicant: AGCO Corporation, Duluth, GA (US)

(72) Inventor: Randall Lohrentz, Buhler, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/536,829

(22) PCT Filed: Dec. 30, 2015

(86) PCT No.: PCT/US2015/068188
§ 371 (c)(1),
(2) Date: Jun. 16, 2017

(87) PCT Pub. No.: WO2016/109747
PCT Pub. Date: Jul. 7, 2016

(65) Prior Publication Data
US 2017/0367262 A1 Dec. 28, 2017

Related U.S. Application Data (60) Provisional application No. 62/098,198, filed on Dec. 30, 2014.

(51) Int. Cl.
A01D 45/02 (2006.01)
A01D 43/08 (2006.01)
A01D 57/22 (2006.01)

(52) U.S. Cl.
CPC ......... *A01D 45/021* (2013.01); *A01D 43/082* (2013.01); *A01D 43/085* (2013.01); *A01D 45/028* (2013.01); *A01D 43/086* (2013.01); *A01D 57/22* (2013.01)

(58) Field of Classification Search
CPC .... A01D 45/021; A01D 45/025; A01D 57/06; A01D 57/22; A01D 57/01; A01D 65/00; A01D 43/082; A01D 43/085; A01D 45/028; A01D 43/086
USPC .............. 56/314, 119, 113, 312, 95, 51, 105
See application file for complete search history.

(56) References Cited

U.S. PATENT DOCUMENTS

| RE27,554 E | * | 1/1973 | Ashton et al. | ....... A01D 45/021 56/105 |
| 4,300,335 A | | 11/1981 | Anderson | |
| 4,435,946 A | | 3/1984 | Erickson | |
| 5,910,092 A | | 6/1999 | Bennett | |
| 6,247,297 B1 | | 6/2001 | Becker | |

(Continued)

OTHER PUBLICATIONS

UK Intellectual Property Office, International Search Report for related UK Application No. GB1500831.1 dated Jun. 22, 2015.

(Continued)

*Primary Examiner* — Robert E Pezzuto (57) ABSTRACT

A corn harvesting header (24) includes a powered row unit (38) and a gathering hood (98). The row unit (38) defines a longitudinal crop row path that extends in a generally rearward crop travel direction and receives a corn row as the header (24) is advanced along the corn row. The gathering hood (98) partly overlies the row unit (38) and includes a laterally extending dam (132) that restricts corn from moving forwardly. The dam (132) at least partly defines a gutter to receive corn kernels and direct the corn kernels rearwardly.

10 Claims, 9 Drawing Sheets (56) References Cited

U.S. PATENT DOCUMENTS

| | | | |
|---|---|---|---|
| 7,240,471 B2* | 7/2007 | Mossman | A01D 45/021 |
| | | | 56/109 |
| 7,373,767 B2* | 5/2008 | Calmer | A01D 45/025 |
| | | | 56/51 |
| D697,944 S | 1/2014 | Walker et al. | |
| 9,265,198 B2* | 2/2016 | Hulstein | A01D 45/021 |
| 10,021,832 B2* | 7/2018 | Wenger | A01D 57/06 |
| 2006/0174603 A1 | 8/2006 | Mossman | |
| 2014/0298769 A1 | 10/2014 | Walker et al. | |
| 2015/0128549 A1 | 5/2015 | Hulstein et al. | |

OTHER PUBLICATIONS

European Patent Office, International Search Report for parent International Application No. PCT/US2015/068188, dated Apr. 13, 2016.

* cited by examiner

CORN HEADER CONFIGURED TO REDUCE KERNEL LOSSES

RELATED APPLICATION

Under provisions of 35 U.S.C. § 119(e), Applicant claims the benefit of U.S. Provisional Application No. 62/098,198, entitled CORN HEADER CONFIGURED TO REDUCE KERNEL LOSSES and filed Dec. 30, 2014, which is incorporated herein by reference.

BACKGROUND

Field of Invention

The present invention relates generally to row crop harvesters. More specifically, embodiments of the present invention concern a row crop header with a gathering hood to reduce kernel losses.

Discussion of Prior Art

Conventional corn harvesting machines include a corn header with a plurality of discrete row units spaced laterally along the header length. The header is positioned so that each row unit is aligned with a row of corn plants to be harvested and is advanced along the rows to sever the corn stalks and collect the corn ears. In particular, as corn plants are drawn into the header, corn ears are quickly separated from the stalks.

However, conventional corn headers have various deficiencies. For instance, during separation of corn ears, individual corn kernels can become dislodged from the corn ears (so-called "butt shelling"). Prior art headers are configured such that loose corn kernels can easily fall from the header onto the ground.

SUMMARY

The following brief summary is provided to indicate the nature of the subject matter disclosed herein. While certain aspects of the present invention are described below, the summary is not intended to limit the scope of the present invention.

Embodiments of the present invention provide a harvesting header that does not suffer from the problems and limitations of the prior art headers set forth above.

A first aspect of the present invention concerns a corn harvesting header operable to harvest a row of corn. The corn harvesting header broadly includes a powered row unit and a gathering hood. The row unit defines a longitudinal crop row path that extends in a generally rearward crop travel direction and receives the corn row as the header is advanced along the corn row, with the row unit operable to move corn in the crop travel direction. The gathering hood partly overlies the row unit and presents forward and aft ends. The gathering hood includes an outer wall that presents an exposed gathering surface positioned laterally adjacent the crop row path and extends longitudinally between the ends, with at least part of the gathering surface being slanted downwardly toward the crop row path to generally direct corn into the crop row path. The gathering hood further includes a laterally extending dam that projects upwardly from the outer wall adjacent the forward end to restrict corn from moving forwardly along the gathering surface, with the dam and the outer wall cooperatively defining a gutter to receive corn kernels. The dam includes a central section and an end section spaced from the central section in the crop travel direction so that the gutter directs corn kernels rearwardly.

A second aspect of the present invention concerns a corn harvesting header operable to harvest a row of corn. The corn harvesting header broadly includes a powered row unit and a gathering hood. The row unit defines a longitudinal crop row path that extends in a generally rearward crop travel direction and receives the corn row as the header is advanced along the corn row, with the row unit operable to move corn in the crop travel direction. The row unit includes a pair of adjacent deck plates that cooperatively define a longitudinal crop-receiving deck plate opening that extends along the crop row path and is sized to receive stalks of corn, with the deck plate opening presenting a width dimension. The deck plates cooperatively define a forwardmost converging region along which the width dimension tapers in the crop travel direction, with the converging region presenting a rear margin that defines a restricted width dimension. The gathering hood partly overlies the row unit and includes a laterally extending dam that projects upwardly to restrict corn from moving forwardly, with the dam at least partly defining a gutter to receive corn kernels. The gutter slants downwardly toward and presents an end margin that is located adjacent the rear margin of the converging region to direct corn kernels rearwardly of the converging region.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
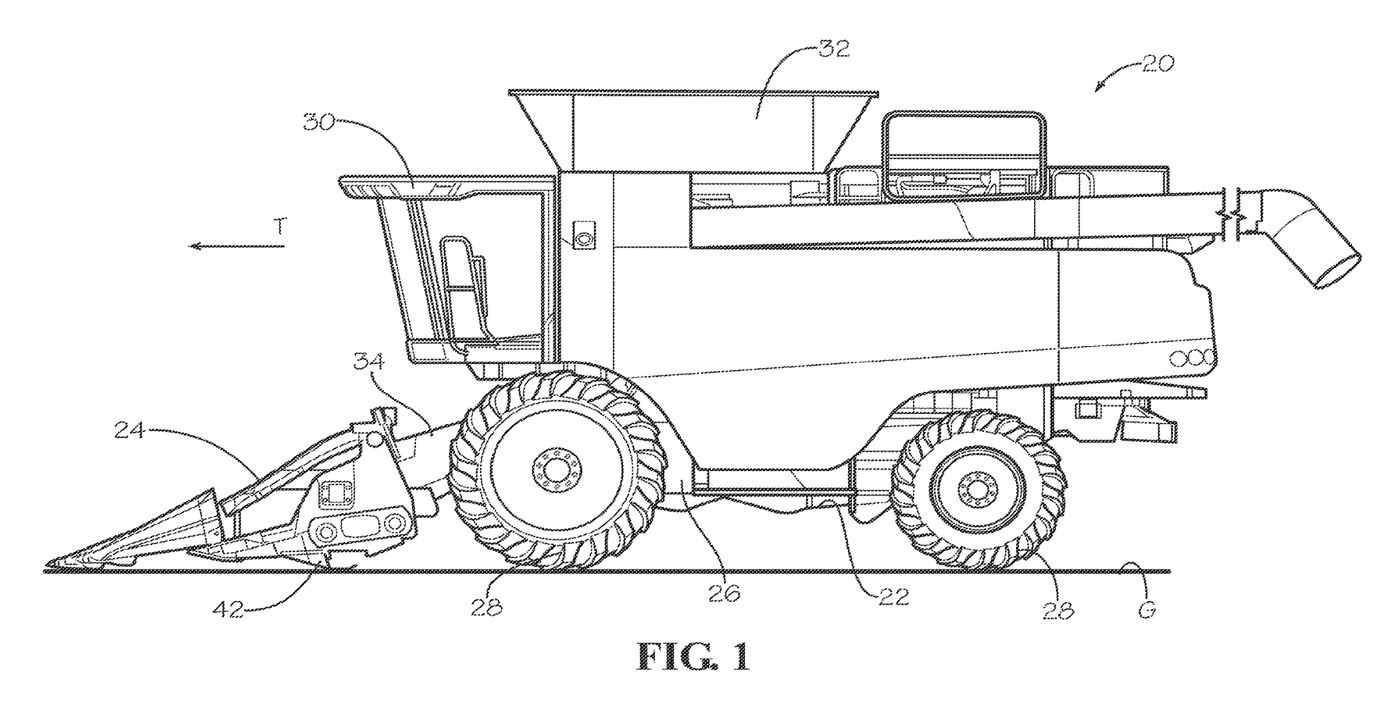
FIG. 1 is a side elevation of a row crop harvester constructed in accordance with a preferred embodiment of the present invention, with the harvester including a wheeled chassis, a feederhouse shiftably supported by the chassis, and a row crop header mounted on an end of the feederhouse.
Figure 2:
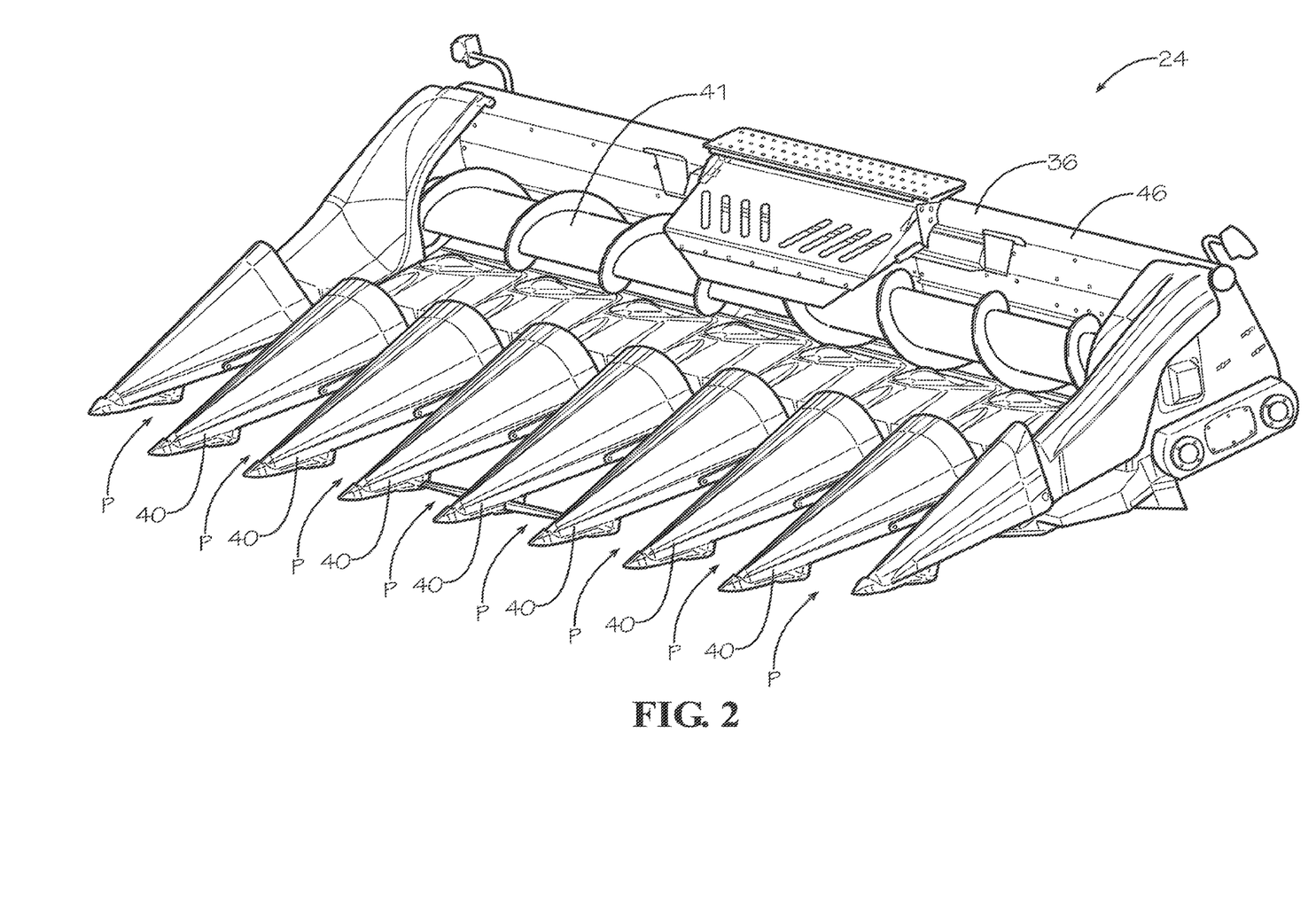
FIG. 2 is a front perspective of the row crop header shown in FIG. 1, showing among other things, a header frame, an auger, and a series of hood assemblies spaced laterally along the header frame.
Figure 3:
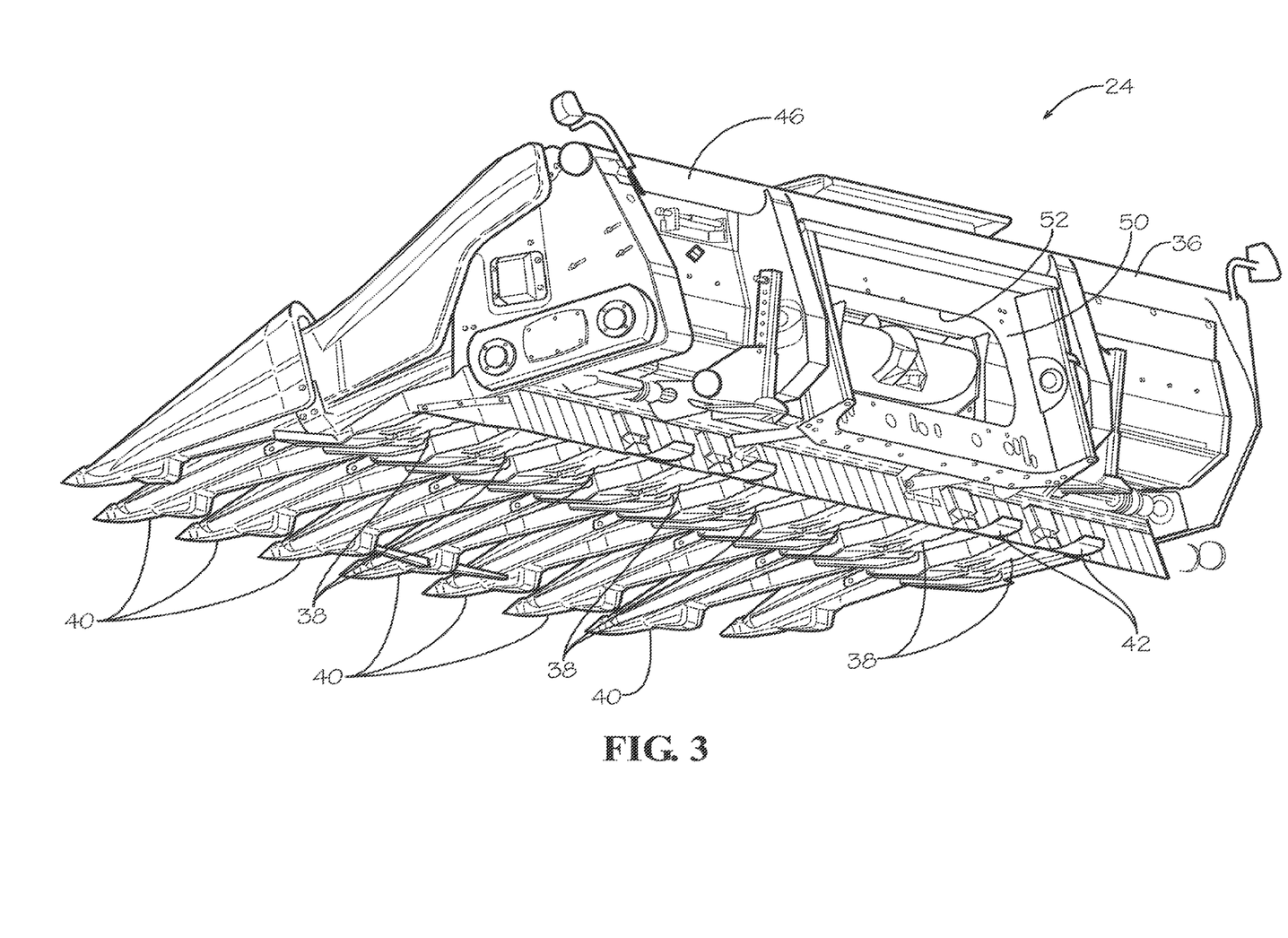
FIG. 3 is a lower perspective of the row crop header shown in FIGS. 1 and 2, showing the header frame, a series of row units supported below the hoods, and stalk stompers supported below the row units.

Turning initially to FIG. 1, a crop harvester 20 is constructed in accordance with a preferred embodiment of the present invention. In the usual manner, the harvester 20 is operable to be advanced in a forward travel direction T to sever crop from a field (not shown). The harvester 20 presents a fore-and-aft extending longitudinal axis that extends in the travel direction T. As is customary, the illustrated harvester 20 produces clean grain from the severed crop material by separating the clean grain from material other than grain (MOG).

The illustrated crop harvester 20 is preferably configured to harvest a row crop, such as corn, and broadly includes a wheeled chassis 22 and a row crop header 24. Preferably, the wheeled chassis 22 comprises a self-propelled machine that collects the separated grain and generally discharges MOG onto the field. The wheeled chassis 22 preferably includes a harvester frame 26, wheels 28, operator enclosure 30, an engine (not shown) that powers the harvester 20, a storage bin 32 operable to store clean grain separated from MOG, and a feederhouse 34.

Turning to FIGS. 1-4, the row crop header 24 comprises a corn header that is operable to be advanced along a series of side-by-side corn rows (not shown) to sever and gather corn plants from the field. However, it is within the ambit of the present invention where the header 24 is alternatively configured and used to harvest other row crops, such as sorghum, soybeans, sunflowers, etc. The header 24 preferably includes a header frame 36, a plurality of row units 38 spaced laterally along the length of the header frame 36 (see FIG. 3), hood assemblies 40 spaced laterally and positioned above the row units 38 (see FIG. 2), an auger 41, and stalk stompers 42.

The header frame 36 supports the row units 38, hood assemblies 40, and the stalk stompers 42 above the ground G. The header frame 36 preferably includes, among other things, a pan 44 that extends under the auger 41, an upper beam 46, and a lower toolbar 48. The pan 44, beam 46, and toolbar 48 extend laterally relative to the travel direction T and across the width of the header frame 36. In the usual manner, the header frame 36 further includes a rear mounting interface 50 that is removably attached to a forward end of the feederhouse 34. The rear mounting interface 50 presents a header discharge opening 52 through which severed plant material is discharged from the header to the feederhouse 34 (see FIG. 3). The toolbar 48 is attached to and supports the row units 38, hood assemblies 40, and the stalk stompers 42.

Turning to FIGS. 2-8, the row units 38 are operable to be supported by the header frame 36 and advanced along the corn rows so that each row unit 38 collects a series of plants that define a respective one of the corn rows. In particular, each row unit 38 defines a fore-and-aft extending row path P (see FIG. 2) along which the row unit 38 is operable to collect the respective corn row. Again, the principles of the present invention are applicable where the row units 38 (and other components of the header 24) are configured for harvesting row crops other than corn. Each row unit 38 preferably includes a row unit housing 54, a row unit drive 56, a pair of gathering chain assemblies 58, a pair of stalk rolls 60, and a blade chopper 62 (see FIGS. 4, 7, and 8). The row unit housing 54 includes a drive housing 64 and a deck plate assembly 66 (see FIG. 4).

Figure 4:
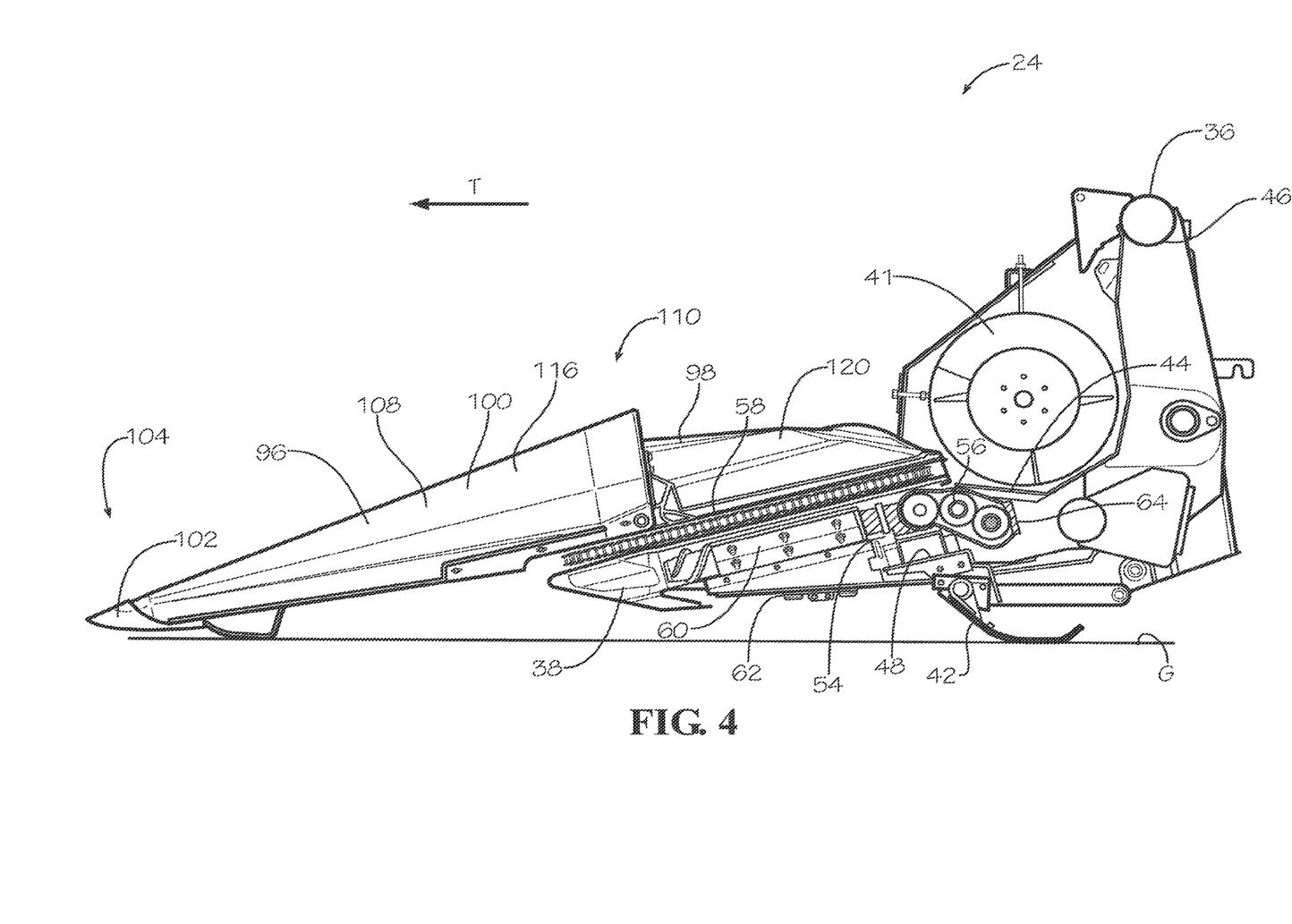
FIG. 4 is a cross section of the row crop header shown in FIGS. 1-3, showing a row unit housing, a row unit drive, a gathering chain assembly, a stalk roll, and a blade chopper of one of the row units, and further showing one of the hood assemblies supported above the row unit.
Figure 5:
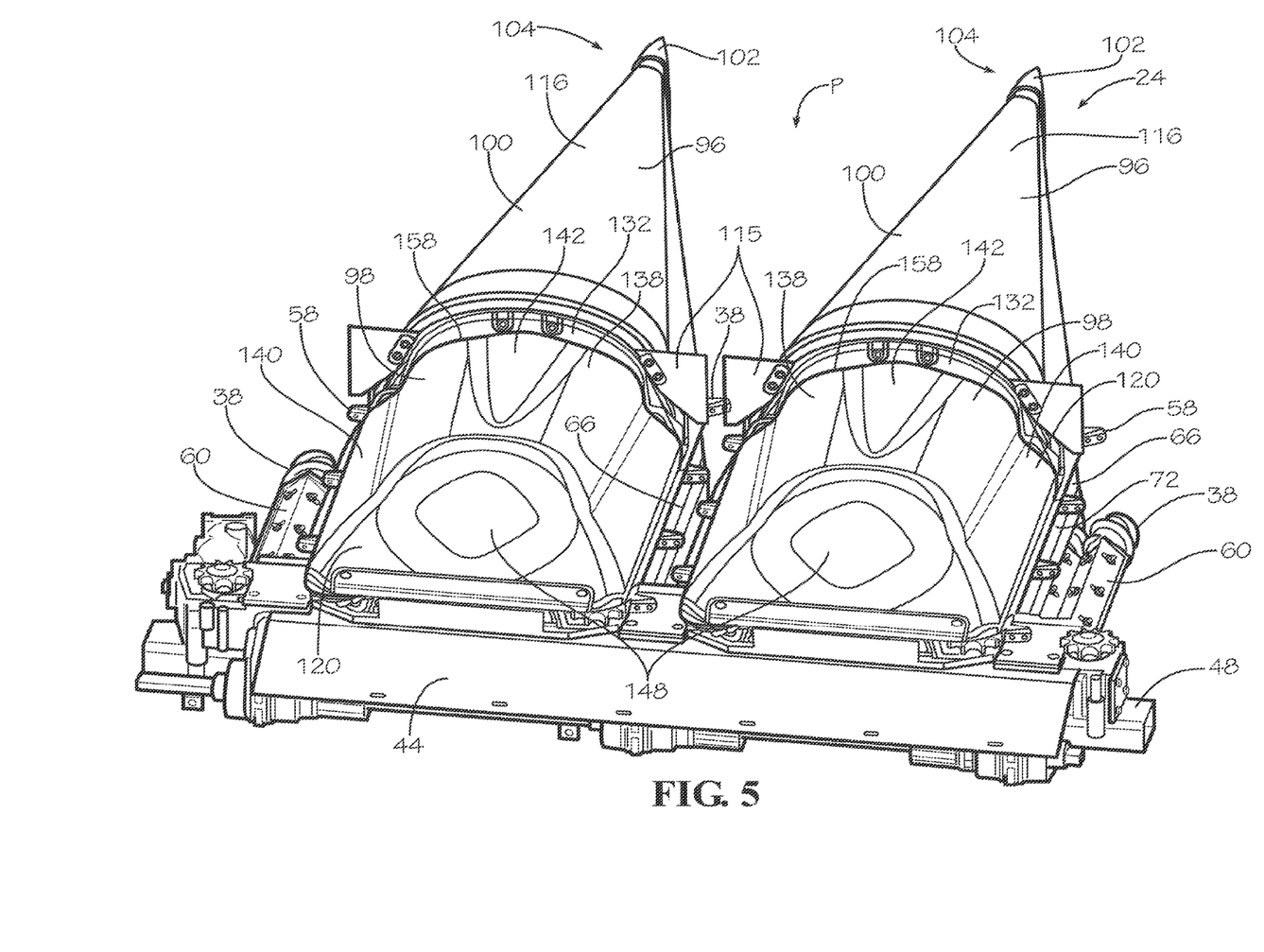
FIG. 5 is a fragmentary rear perspective of the row crop header shown in FIGS. 1-4, showing a pair of hood assemblies supported side-by-side above a series of adjacent row units, with the hood assemblies on opposite sides of a row path.
Figure 7:
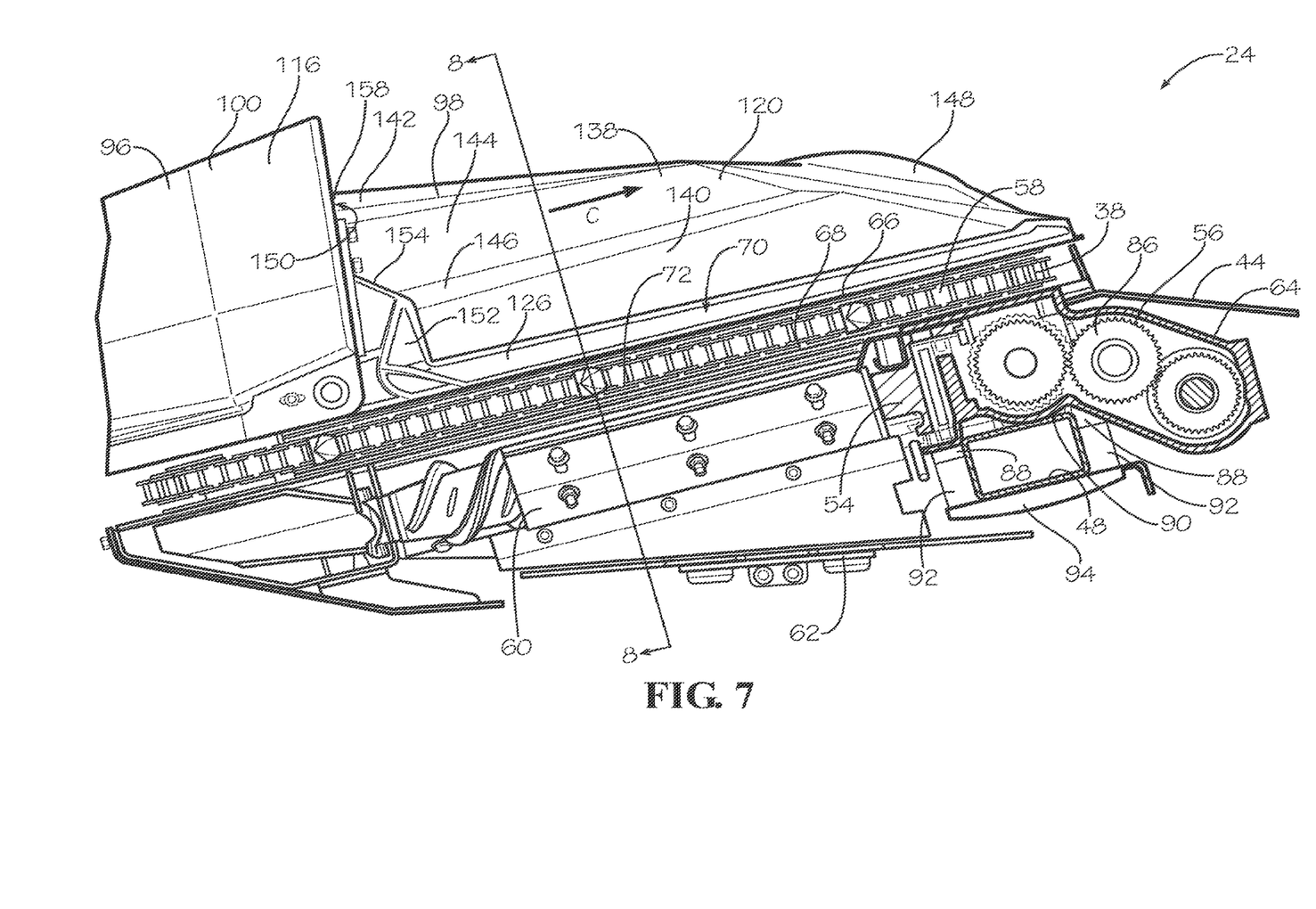
FIG. 7 is an enlarged fragmentary cross section of the row crop header similar to FIG. 4, but showing the row unit and the adjacent hood assembly in greater detail.
Figure 8:
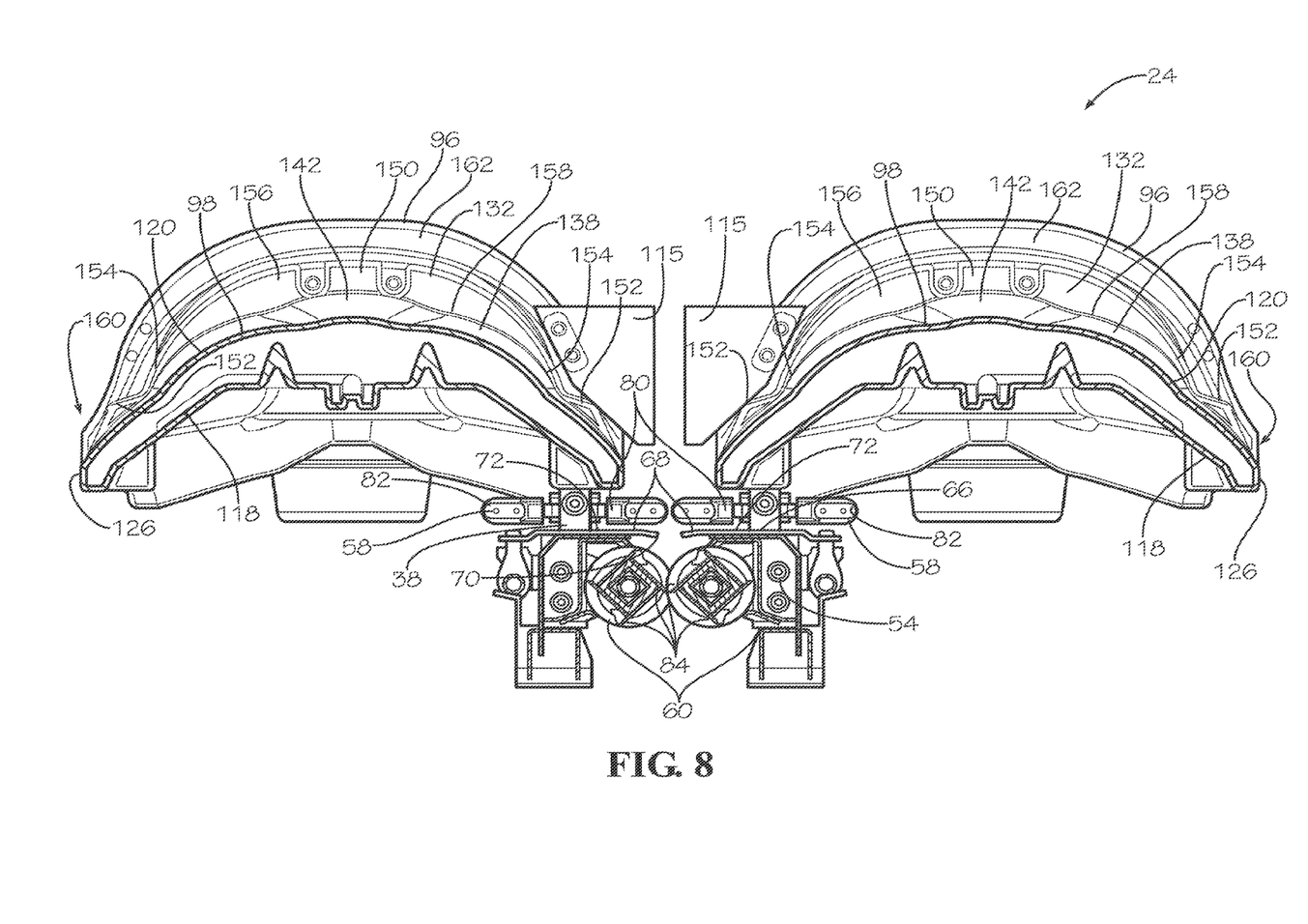
FIG. 8 is a fragmentary cross section of the row crop header taken along line 8-8 of FIG. 7.

The deck plate assembly 66 includes a pair of side-by-side deck plate sections 68 located vertically between the gathering chain assemblies 58 and the stalk rolls 60 (see FIG. 8). The deck plate sections 68 are located adjacent to one another to cooperatively define an elongated deck plate opening 70 that extends in a crop travel direction C (see FIG. 7). The deck plate sections 68 present upper deck surfaces 72 that are parallel to the crop travel direction C.

The deck plate opening 70, which extends in the crop travel direction C, at least partly forms the row path P. The deck plate opening 70 is sized to receive stalks of corn (not shown) and presents a width dimension Dp. The illustrated deck plate sections 68 cooperatively define a forwardmost converging region 74 (see FIG. 6) of the deck plate assembly 66. Along the converging region, the width dimension Dp preferably tapers in the crop travel direction C. The converging region 74 also presents a rear margin 76 (see FIG. 6) that defines a restricted width of the opening 70. The deck plate sections 68 also cooperatively define an aft region 78 (see FIG. 6) that extends rearwardly from the converging region 74. The deck plate sections 68 are preferably positioned so that the opening 70 has a substantially constant width along the aft region 78. Therefore, in the illustrated embodiment, the restricted width of the opening 70 defines the minimum width of the opening 70. However, the principles of the present invention are equally applicable to row units having a variable or increasing opening width in the aft region 78.

In the usual manner, the gathering chain assemblies 58 of each row unit 38 are positioned along opposite sides of the deck plate opening 70 to cooperatively urge plants rearwardly through the deck plate opening 70. More particularly, each gathering chain assembly 58 includes an endless chain that presents an inboard run 80 and an outboard run 82 (see FIG. 8). For each pair of gathering chain assemblies 58, the inboard runs 80 are opposed to one another and cooperatively engage the plants. Furthermore, as the pair of gathering chain assemblies 58 are operated, the corresponding inboard runs 80 both move rearwardly to cooperatively move the plants rearwardly relative to the deck plate assembly 66.

The pair of stalk rolls 60 are positioned along opposite sides of the deck plate opening 70 and rotate in opposite directions to cooperatively pull the plant stalks downwardly. In particular, the stalk rolls 60 cooperatively provide opposed pairs of blades 84 (see FIG. 8) that rotate into and out of engagement with one another. As the stalk rolls 60 are rotated, each opposed pair of blades 84 moves generally in a downward direction as the pair of blades 84 rotate into and out of engagement. Thus, while the stalk rolls 60 are rotated, each pair of blades 84 operates to pinch the plant stalks and pull the plant stalks downwardly.

As corn plants are drawn downwardly by the stalk rolls 60, corn ears engage the deck plate sections 68 so that the stalks are separated from the corn ears. During separation of corn ears, some kernels can become dislodged from the ears (a process often referred to as "butt shelling"). As will be discussed, the hood assemblies 40 are configured to direct the corn ears and dislodged kernels toward the row path P.

The drive 56 is operable to power the gathering chain assemblies 58 and the stalk rolls 60. The drive 56 preferably includes a gear train 86 located within the drive housing 64 and a motor (not shown) that powers the gear train 86 (see FIG. 7). The gear train 86 is operably housed within the drive housing 64.

The drive housing 64 comprises a rigid sealed enclosure and preferably includes lower mounting bosses 88 (see FIG. 7) with internal threads (not shown). The drive housing 64 also presents lateral channels 90 that extend between pairs of the bosses 88 (see FIG. 7). The channels 90 are sized and configured to securely receive the toolbar 48.

Turning to FIG. 7, the row unit housing 54 also preferably includes tubular spacers 92, a pair of elongated brackets 94, and threaded bolts (not shown). The spacers 92 and bolts cooperatively provide forward and aft fasteners to secure the illustrated drive housing 64 to the toolbar 48. The brackets 94 each comprise a unitary rigid element that is elongated and presents forward and rearward bracket ends, with fastener holes (not shown) being adjacent the bracket ends. While the illustrated brackets 94 are preferred to secure the drive housing 64 to the toolbar 48, the brackets 94 could be alternatively constructed without departing from the scope of the present invention.

The bolts (not shown) are removably inserted through the spacers 92 so as to be threaded into the bosses 88. The principles of the present invention are applicable where the row unit housing 54 includes alternative fasteners for being secured to the toolbar 48.

The drive housing 64 is removably secured to the toolbar 48 by positioning the drive housing so that the channel 90 receives the toolbar 48, with bosses 88 located on opposite sides of the toolbar 48. Each bracket 94 is positioned below the toolbar 48 and receives a pair of spacers 92. The bolts are inserted through the bracket 94 and the corresponding spacers 92 by aligning the bores of the spacers 92 with the fastener holes of the bracket 94.

With the bracket 94, spacers 92, and bolts being located below the toolbar 48, the bolts can be threaded into engagement with the respective bosses 88 so that the drive housing 64 and the bracket 94 are clamped against opposite sides of the toolbar 48. In this manner, the row unit housing 54 is securely mounted to the toolbar 48. However, it is within the ambit of the present invention where the row unit housing 54 is alternatively mounted on the toolbar 48. For instance, the header 24 could include mounting components other than the spacers 92, brackets 94, and bolts to secure the drive housing 64 to the toolbar 48.

Turning to FIGS. 4-10, the hood assemblies 40 are spaced laterally and positioned above the row units 38. Each of the illustrated hood assemblies 40 preferably includes a snout 96 and a gathering hood 98. The snout 96 preferably includes a unitary tapered body 100 and a metal tip 102 (see FIGS. 4 and 5). The metal tip 102 is attached to the body 100 and forms a forward tip end 104 of the snout 96. Preferably, the body 100 comprises a unitary molded structure and includes inner and outer walls 106,108 that extend longitudinally between forward tip end 104 and an aft end 110 of the snout 96 (see FIGS. 4 and 9). The inner wall 106 forms an aft opening 112 and a covered recess 114 that communicates with the aft opening 112 (see FIGS. 4 and 9). The snout 96 also preferably includes flaps 115 (see FIG. 5) that are attached to the aft end 110 and are configured to restrict corn ears from falling off of the header 24.

Figure 9:
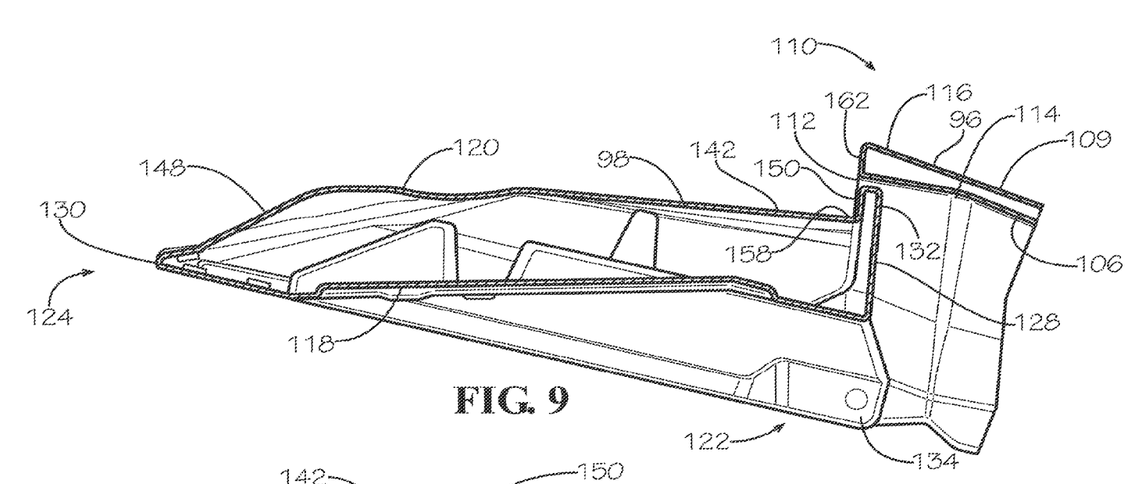
FIG. 9 is a fragmentary cross section of one of the hood assemblies shown in FIGS. 1-8, showing a snout and a gathering hood of the hood assembly, with the snout and gathering hood being pivotally attached to one another.

The outer wall 108 is positioned laterally adjacent to corresponding row paths P and extends longitudinally between the ends 104,110 to present an exposed snout surface 116 to gather and direct crop into adjacent row paths P. The snout surface 116 preferably tapers from the aft end 110 of the snout 96 toward the tip end 104. The snout 96 extends forwardly of the gathering hood 98 and is operable to direct the corn row into adjacent row paths P. As will be discussed, the illustrated snout 96 is pivotally attached to the gathering hood 98.

Each gathering hood 98 is operable to direct corn toward adjacent row paths P. Notably, it has been found that the illustrated gathering hoods 98 are effective at directing corn ears and dislodged kernels toward the row path P. The gathering hoods 98 are particularly effective at directing any dislodged kernels toward the row path P and, most preferably, directing any dislodged kernels rearwardly of the converging region 74.

Figure 10:
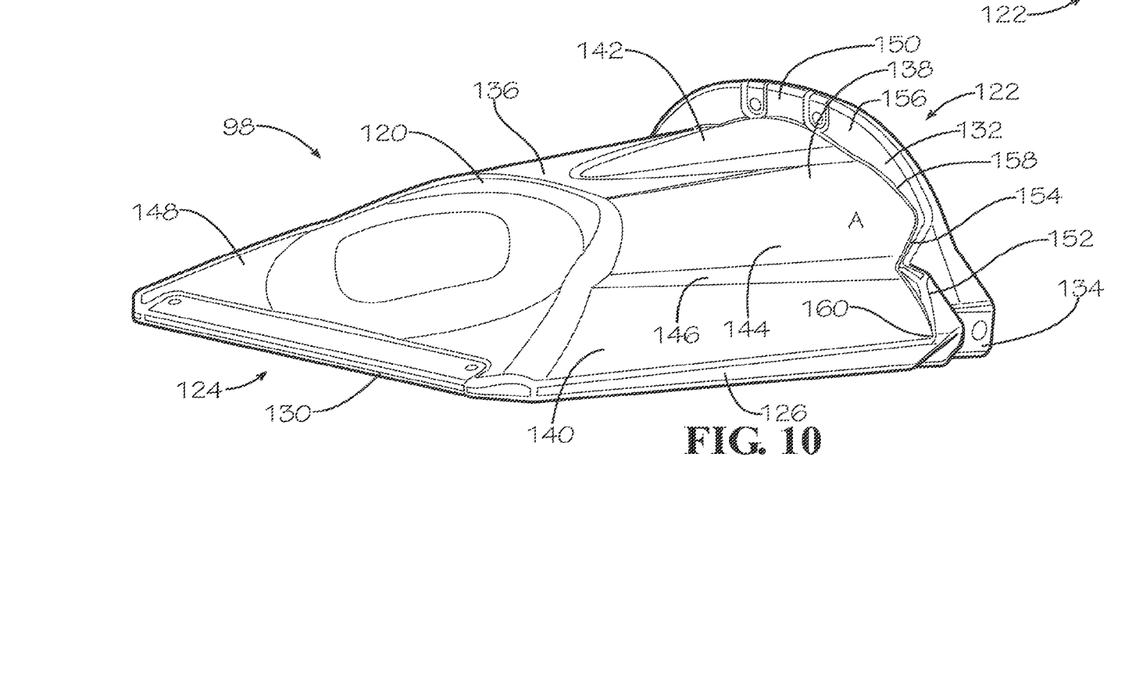
FIG. 10 is a rear perspective of the gathering hood shown in FIG. 9.

The gathering hood 98 is preferably unitary and includes inner and outer walls 118,120 that extend longitudinally between forward and aft ends 122,124 of the gathering hood 98 (see FIGS. 9 and 10). The inner and outer walls 118,120 are interconnected by opposite side walls 126 and forward and aft end walls 128,130. The gathering hood 98 also preferably includes a laterally extending dam 132 and lower flanges 134 adjacent the forward end 122 (see FIGS. 9 and 10).

Turning to FIGS. 9 and 10, the outer wall 120 is positioned between corresponding row paths P and extends longitudinally between the forward and aft ends 122,124. The outer wall 120 presents an exposed gathering surface 136 positioned laterally adjacent to the respective row paths P. The gathering surface 136 preferably includes a generally convex central surface 138 and side surfaces 140 located on opposite sides of the central surface 138.

The central surface 138 includes a centrally located hump portion 142 that projects from the dam 132. Hump portion 142 is preferably raised relative to the remaining portion of the central surface 138. It has been found that the hump portion 142 is particularly effective for moving kernels away from the dam 132. The central surface 138 has a generally convex shape along a transverse cross-section. The central surface 138 is positioned and configured so that as to direct corn kernels toward the side surfaces 140. In particular, the central surface 138 preferably includes outboard side margins 144 that are slanted downwardly toward the adjacent row path P to generally direct corn toward the row path P.

Each of the side surfaces 140 also has a generally convex shape along a transverse cross-section. Each side surface 140 is preferably slanted downwardly toward the adjacent row path P to generally direct corn toward the row path P. Thus, the central and side surfaces 138,140 cooperatively direct corn into the respective row paths P. Each side margin 144 of the central surface 138 preferably meets a corresponding one of the side surfaces 140 along a fore-and-aft extending channel 146 (see FIGS. 6 and 10).

The gathering surface 136 also preferably includes an aft surface 148 positioned rearwardly of the central surface 138.

The aft surface 148 is positioned and configured to direct corn kernels in a generally rearward direction. In particular, the aft surface 148 preferably slopes downwardly in the rearward direction. The aft surface 148 also preferably includes a generally raised hump portion to deflect crop toward either side.

The laterally extending dam 132 is preferably configured to restrict corn from moving forwardly along the outer wall 120. The dam 132 is elongated and preferably includes a central section 150, opposite end sections 152, and transition sections 154 (see FIGS. 6, 8, and 10). The dam 132 also presents a rear facing dam surface 156 that extends continuously along the sections 150,152,154 (see FIGS. 8 and 10).

Preferably, the laterally extending dam 132 projects upwardly from the outer wall 120 adjacent the forward end 122. The dam 132 and the outer wall 120 cooperatively define a gutter 158 to receive corn kernels. In the illustrated embodiment, the end sections 152 of the dam 132 are spaced from the central section 150 in the crop travel direction C (see FIG. 7). This positioning of the sections 150,152 causes the gutter 158 to direct corn kernels rearwardly.

The transition sections 154 interconnect the central section 150 and the end sections 152 such that corn kernels can travel from the central section 150 to one of the end section 152 by traveling along the gutter 158. The central section 150 and each transition section 154 cooperatively define an obtuse included angle A (see FIG. 10).

Figure 6:
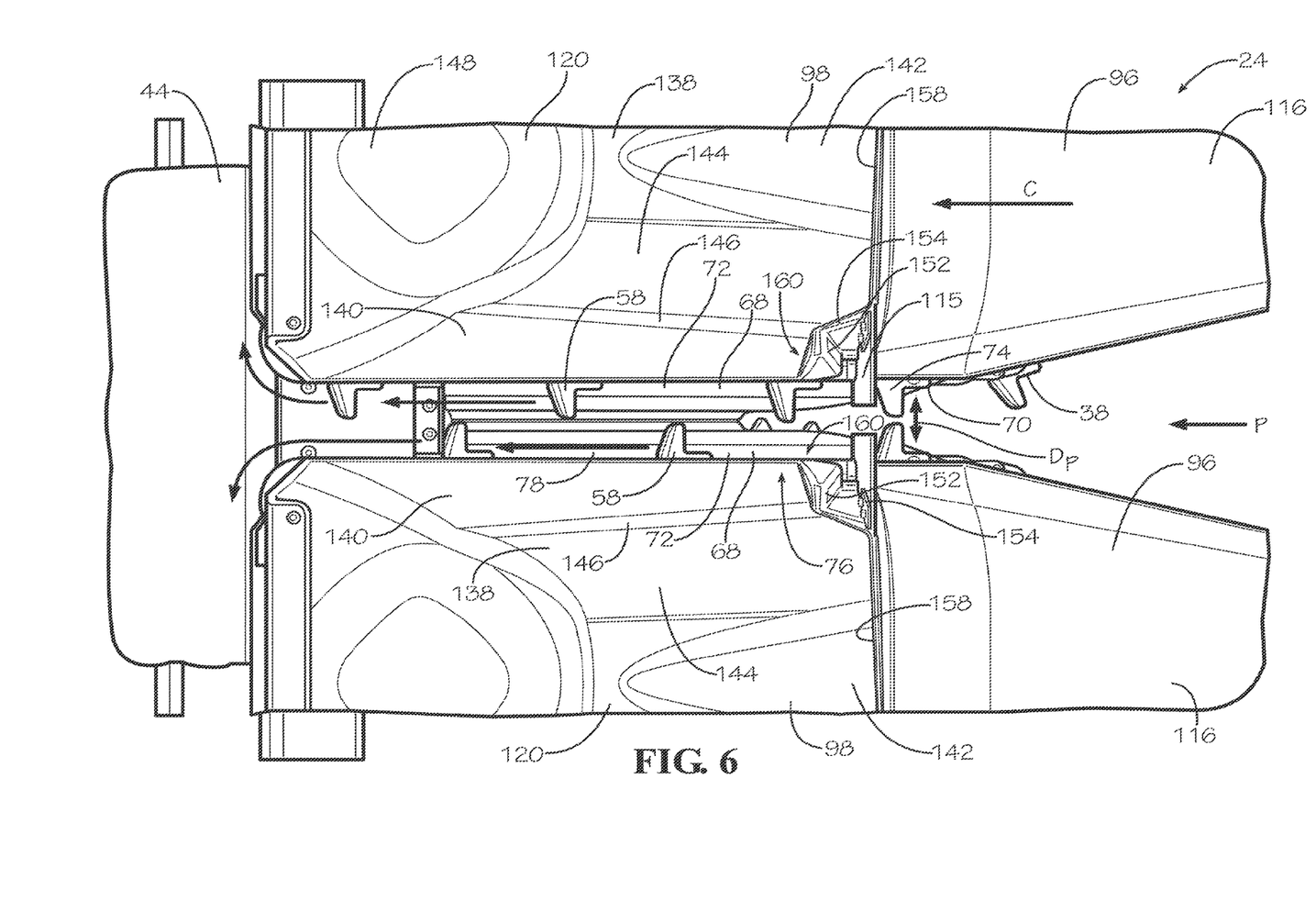
FIG. 6 is a fragmentary top view of the row crop header shown in FIGS. 1-5, showing inboard runs of one gathering chain assembly located below the hood assemblies, and further showing a pair of deck plate sections located below the inboard runs.

The gutter 158 presents opposite end margins 160 that are preferably located adjacent the rear margin 76 of the respective converging region 74 (see FIG. 6). In this manner, the gutter 158 directs corn kernels rearwardly of the converging region 74.

In the illustrated embodiment, each gathering hood 98 is preferably positioned so as to partly overlie adjacent row units 38. In this manner, the gathering hood 98 is operable to direct corn into corresponding row paths P. The gathering hood 98 is also preferably positioned so as to be coaxially aligned with the corresponding snout 96. Furthermore, the gathering hood 98 is located so that the aft opening 112 of the snout 96 at least partly receives the forward end 122 of the gathering hood 98. In other words, a rear portion of the snout 96 preferably overlaps the gathering hood 98.

The illustrated dam 132 is positioned so that the central section 150 of the dam 132 is also received in the aft opening 112 of the snout 96. However, the end sections 152 of the dam 132 are preferably located rearwardly of the snout 96. The dam surface 156 of the end sections 152 is generally perpendicular to the crop travel direction C.

Again, the gathering hood 98 is preferably pivotally attached to the snout 96. In particular, the flanges 134 are pivotally secured to the aft end 110 of the snout 96 with fasteners (not shown).

The snout 96 is preferably pivotal relative to the gathering hood 98 between a lowermost position (see FIG. 4) and an uppermost position (not shown). The hood assembly 40 includes a stop (not shown) that engages the snout 96 in the lowermost position to restrict downward movement of the snout 96 beyond the lowermost position. Similarly, the end section 152 of the dam 132 engages the snout 96 in the uppermost position to restrict upward movement of the snout 96 beyond the uppermost position.

In the lowermost position, the dam surface 156 of the central section 150 is positioned adjacent to and substantially aligned fore-and-aft with a rear surface 162 of the snout 96 (see FIGS. 8 and 9). Thus, the dam surface 156 and the rear surface 162 cooperatively restrict corn from moving forwardly along the hood assembly 40, particularly when the snout 96 is in the lowermost position. In the uppermost position (not shown), the snout 96 engages the end sections 152 and projects rearwardly beyond the central section 150 of the dam 132.

In operation, the harvester 20 is operable to be advanced along a series of side-by-side corn rows (not shown) to sever and gather corn plants from the field. As the harvester 20 is advanced, one or more of the row units 38 of the header 24 receive corresponding corn rows. Each hood assembly 40 is operable to engage adjacent corn rows and direct the corn rows along the row path P. The deck plate sections 68 are also operable to engage and direct the corn rows along the row path P. As corn plants enter the converging region 74, the corn plants are collected and moved rearwardly by the corresponding inboard runs 80 of the chain assembly 58. Also, the stalk rolls 60 rotate in opposite directions to cooperatively pull the corn stalks downwardly.

As corn plants are drawn downwardly by the stalk rolls 60, corn ears engage the deck plate sections 68 so that the stalks are separated from the corn ears. During separation of corn ears, some kernels can become dislodged (i.e., "butt shelled") from the ears. The gathering hoods 98 are configured to direct the corn ears and dislodged kernels into the row path P. Importantly, any dislodged kernels received by the gutter 158 are preferably directed rearwardly of the converging region 74 by features of the gutter 158, such as the end sections 152. The separated corn ears and dislodged kernels are discharged from the row units 38 and directed by the gathering hoods 98 rearwardly toward the auger 41.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A corn harvesting header operable to harvest a row of corn, said corn harvesting header comprising:
   a powered row unit defining a longitudinal crop row path that extends in a generally rearward crop travel direction and receives the corn row as the header is advanced along the corn row, with the row unit operable to move corn in the crop travel direction, said row unit including a pair of adjacent deck plates that cooperatively define a longitudinal crop-receiving deck plate opening extending along the crop row path and sized to receive stalks of corn, with the deck plate opening presenting a width dimension, said deck plates cooperatively defining a forwardmost converging region along which the width dimension tapers in the crop travel direction, with the converging region presenting a rear margin that defines a restricted width dimension; and a gathering hood partly overlying the row unit and presenting forward and aft ends, said gathering hood including an outer wall that presents an exposed gathering surface positioned laterally adjacent the crop row path and extending longitudinally between the ends, with at least part of the gathering surface being slanted downwardly toward the crop row path to generally direct corn into the crop row path, said gathering hood further including a laterally extending dam that projects upwardly from the outer wall adjacent the forward end to restrict corn from moving forwardly along the gathering surface, with the dam and the outer wall cooperatively defining a gutter to receive corn kernels, said dam including a central section and an end section spaced from the central section in the crop travel direction, said dam including a transition section that interconnects the central section and the end section so that the gutter extends continuously between the sections, said transition section and said central section cooperatively defining an obtuse included angle so that the gutter directs corn kernels rearwardly, said gutter presenting an end margin that is located adjacent the rear margin of the converging region to direct corn kernels rearwardly of the converging region.

2. The corn harvesting header as claimed in claim 1,
said gathering surface including a generally central surface and side surfaces located on opposite sides of the central surface, said central surface having a convex shape along a transverse cross-section and being positioned so that the central surface directs corn kernels toward at least one of the side surfaces.

3. The corn harvesting header as claimed in claim 2,
said gathering surface including a rear surface positioned rearwardly of the central surface to direct corn kernels rearwardly of the gathering hood.

4. The corn harvesting header as claimed in claim 2,
said central surface including a centrally located hump portion that projects from the dam,
said hump portion being raised relative to a remaining portion of the central surface.

5. The corn harvesting header as claimed in claim 1,
said deck plates cooperatively defining a forwardmost converging region along which the width dimension tapers in the crop travel direction.

6. The corn harvesting header as claimed in claim 1; and
a snout extending forwardly of the gathering hood and operable to direct the corn row into the row path,
said snout presenting a forward tip end and an exposed snout surface that tapers forwardly toward the tip end.

7. The corn harvesting header as claimed in claim 6, said snout and said gathering hood being coaxially aligned and pivotally attached to one another, with the snout being pivotal relative to the gathering hood into and out of a lowermost position.

8. The corn harvesting header as claimed in claim 7,
said snout presenting an aft opening that at least partly receives the forward end of the gathering hood so that the snout overlaps the gathering hood.

9. The corn harvesting header as claimed in claim 8,
said aft opening of the snout receiving the central section of the dam, with the end section being located rearwardly of the snout.

10. The corn harvesting header as claimed in claim 9,
said snout being pivotal relative to the gathering hood into and out of an uppermost position,
said end section of the dam engaging the snout in the uppermost position to restrict upward movement of the snout beyond the uppermost position.

\* \* \* \* \*